United States Patent [19]

Stephens, Jr.

[11] 4,436,039
[45] Mar. 13, 1984

[54] ROLLING DRUM TREE PLANTER

[76] Inventor: Marion A. Stephens, Jr., 1749 Ivan Clyde Dr., Bogalusa, La. 70427

[21] Appl. No.: 399,247

[22] Filed: Jul. 19, 1982

[51] Int. Cl.³ ............................................. A01C 11/02
[52] U.S. Cl. ......................................... 111/2; 280/206
[58] Field of Search ......................................... 111/1–3, 111/89–93, 77, 74; 280/78, 207, 208, 325, 206, 205; 180/10

[56] References Cited

U.S. PATENT DOCUMENTS

| | | | |
|---|---|---|---|
| 491,994 | 2/1893 | Erickson | 111/90 |
| 4,061,094 | 12/1977 | Cary et al. | 111/77 X |
| 4,344,374 | 8/1982 | Gangluff et al. | 111/2 |

FOREIGN PATENT DOCUMENTS

| | | | |
|---|---|---|---|
| 84417 | 6/1921 | Austria | 111/91 |
| 531643 | 8/1931 | Fed. Rep. of Germany | 111/91 |
| 854301 | 8/1981 | U.S.S.R. | 111/2 |

*Primary Examiner*—Robert A. Hafer
*Assistant Examiner*—Danton DeMille
*Attorney, Agent, or Firm*—LeBlanc, Nolan, Shur & Nies

[57] ABSTRACT

An improved tree planting machine which includes a rotatable drum mounted over an upright carriage assembly. A plurality of soil penetrating implements or dibbles are positioned at equal intervals on the outer circumference of and adjacent slotted openings through the drum. A tongue assembly for connection to a tractor or similar vehicle is provided with a forked portion with arms extending back adjacent the sides of the rotating drum and attached to each side of the carriage assembly. A seat for the operator is mounted within the carriage. In carrying out the tree planting process, as the machine is pulled over the ground by the tractor, the operator, who is inside the carriage, places the rooted end of a small seedling or other plant through an opening in the carriage and on through a drum slot adjacent one of the dibbles. As the dibble is forced into the ground during rotation of the drum, the roots of the seedling are moved into the slit in the ground created by the dibble. Packing blocks mounted on each side of the drum slot force dirt in around the root collar of the seedling and the planting operation is complete. A spring actuated slot cleaner maintains the drum slots free of mud and debris.

11 Claims, 4 Drawing Figures

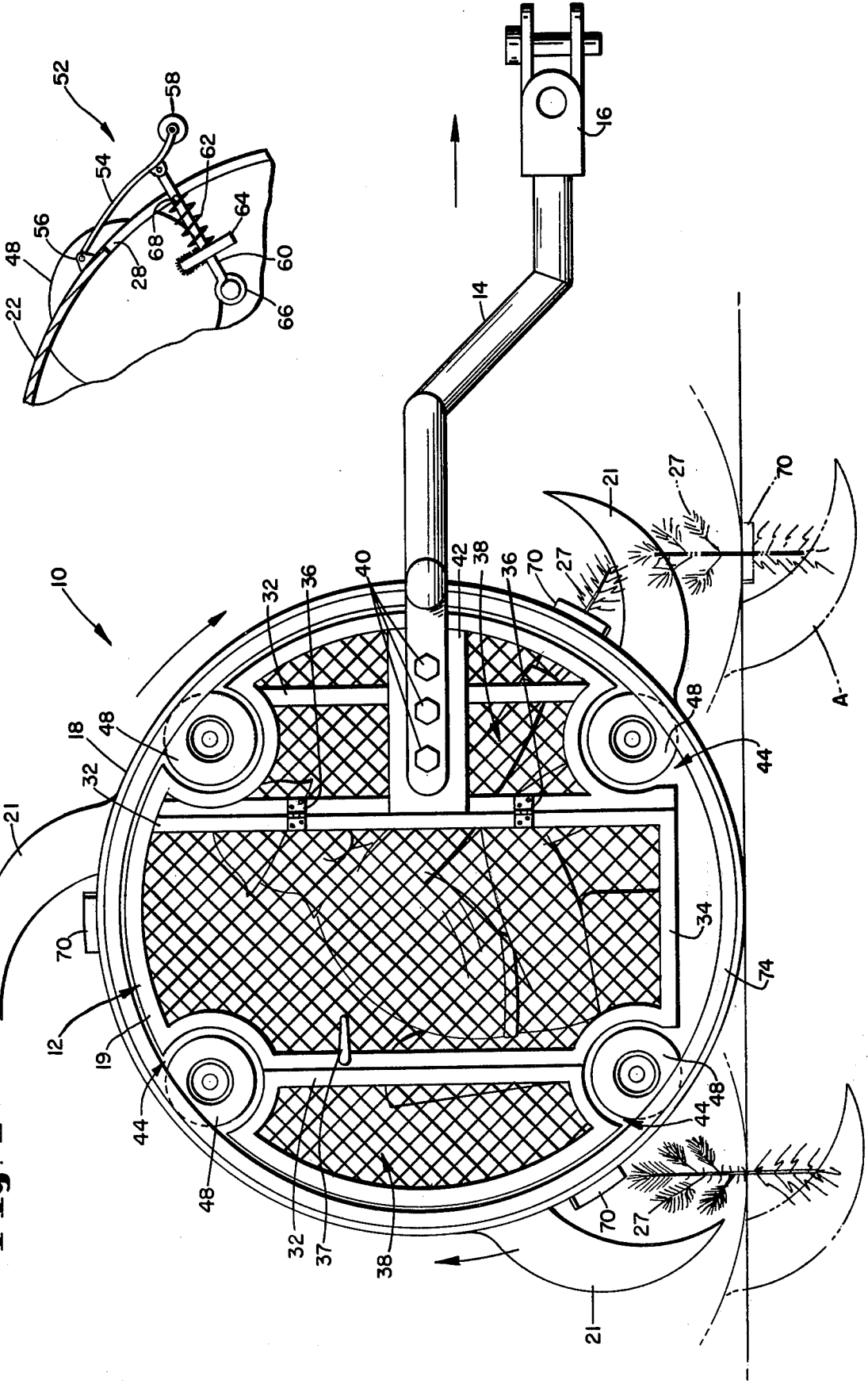

ROLLING DRUM TREE PLANTER

BACKGROUND AND SUMMARY OF THE INVENTION

The present invention relates to a tree planting apparatus. More particularly, the present invention relates to a rolling drum tree planter apparatus which includes an outer drum rotatably mounted about a carriage assembly which provides a seat for use by the operator of the apparatus. The apparatus is pulled by a tractor or other vehicle during planting, with the carriage assembly and the operator remaining in an upright position while the outer drum with attached soil penetrating implements rotates as it travels over the ground.

Various machines are known in the prior art for use in the planting of trees and shrubs on a large scale such as in reforesting operations. Examples of such prior art machines are described in the following U.S. Pat. Nos. 3,899,985 to Rath; 2,463,938 to Bancroft; and 2,944,495 to Wilson et al.

The Rath patent discloses a soil penetrating tool which is mounted on a half-track or other suitable vehicle and which includes releasable clamping means for supporting the roots of a plant to be introduced at an oblique angle, preferably along a circular path, into the soil. The soil penetrating tool is rotatably mounted about a shaft attached to a gear box mounted on the vehicle. The soil penetrating tool carrying the clamped plant is introduced into the soil by suitable reciprocating means such as a pneumatic jack. When the tool has moved into a position wherein the plant is in a vertical position in the soil, the clamping means is released and the tool is withdrawn from the soil.

The Bancroft and Wilson et al patents disclose plant setting machines of the type in which a series of plants are rotatably moved into position for planting, and with a fixed furrow opening device being attached to the machine for the purpose of opening a planting furrow as the machine travels over the ground.

By the present invention there is provided an improved tree planting machine which includes the above noted carriage assembly connected by a tongue assembly to a tractor or other vehicle for pulling the machine over the terrain to be planted. A drum and dibble assembly is mounted for rotation around the circumference of the carriage. The tongue assembly has a forked portion which extends back adjacent the sides of the rotating drum and attaches to each side of the carriage assembly. A seat for the operator is mounted within the carriage. Thus as the machine is pulled along during planting, the carriage assembly and the operator remain in an upright position while the drum rotates as it rolls over the ground.

In one embodiment, the drum and dibble assembly includes three scimitar-shaped dibbles which are attached at intervals to the periphery of the drum. Each dibble is in the form of an outwardly extending blade with a scimitar-shape having a generally thicker portion at the base and being narrower toward the outer end of the blade. A drum slot is located just behind the base of each dibble, with a dirt packing block mounted on each side of the drum slot.

In carrying out the tree planting process, the operator places the rooted end of a small seedling or other plant through an opening in the carriage and through the drum slot so that the seedling is in position prior to the time that the corresponding dibble touches the ground. As the dibble is forced into the ground, the roots of the seedling are moved into the slit in the ground created by the blade portion of the dibble. As the dibble reaches the full vertical position, the packing blocks force dirt in around the root collar of the seedling and the planting operation is complete. A spring actuated slot cleaner is mounted on the carriage assembly for use in maintaining the drum slots free of mud and debris.

Accordingly, it is an object of the present invention to provide a tree planting machine which may be easily pulled over the ground during the planting operation.

It is another object of the invention to provide a tree planting machine which is of simplified construction, and which does not require hydraulic or pneumatic machinery for operation.

It is another object of the invention to provide a tree planting machine in the form of a rolling drum having a series of blade-shaped dibbles extending therefrom for use in opening the ground during the planting operation, thus avoiding continuous plowing action so that obstacles such as roots and rocks and the like do not have to be avoided as much as with a conventional planter.

It is a further object of the invention to provide a rolling drum tree planting machine in which the operator is maintained in an upright position and with means for attaching the machine to any of various tractors or other vehicles so as to be easily pulled over the ground during the planting operation.

It is a further object of the invention to provide a tree planting machine which can overcome obstacles of appreciable height, so that the rows are straighter and the distance between rows will be more uniform as such obstacles are rolled over by the drum planter rather than having to turn so as to avoid such obstacles.

It is a still further object of the invention to provide a tree planting machine which operates much like a wheel, putting little strain on the tractor unit, so as to be operable during wet ground conditions without getting stuck as has been frequently experienced with conventional planters.

It is a still further object of the invention to provide a tree planting machine in which the operator is well protected from the danger of injury during the planting operation.

It is another object of the invention to provide a tree planter in which the spacing between trees is precisely controlled so as to provide for the planting of a precise number of trees for a particular area of land.

BRIEF DESCRIPTION OF THE DRAWINGS

FIG. 3 is a cross-sectional view of a portion of the tree planter taken along line 3—3 of FIG. 2 showing the slot cleaner employed with the present tree planter.

FIG. 4 is a schematic representation showing the movement of the tree planter of FIG. 1 over the ground, with the openings in the ground made by the dibble assemblies being shown in dashed lines.

DESCRIPTION OF THE PREFERRED EMBODIMENTS

Figure 1:
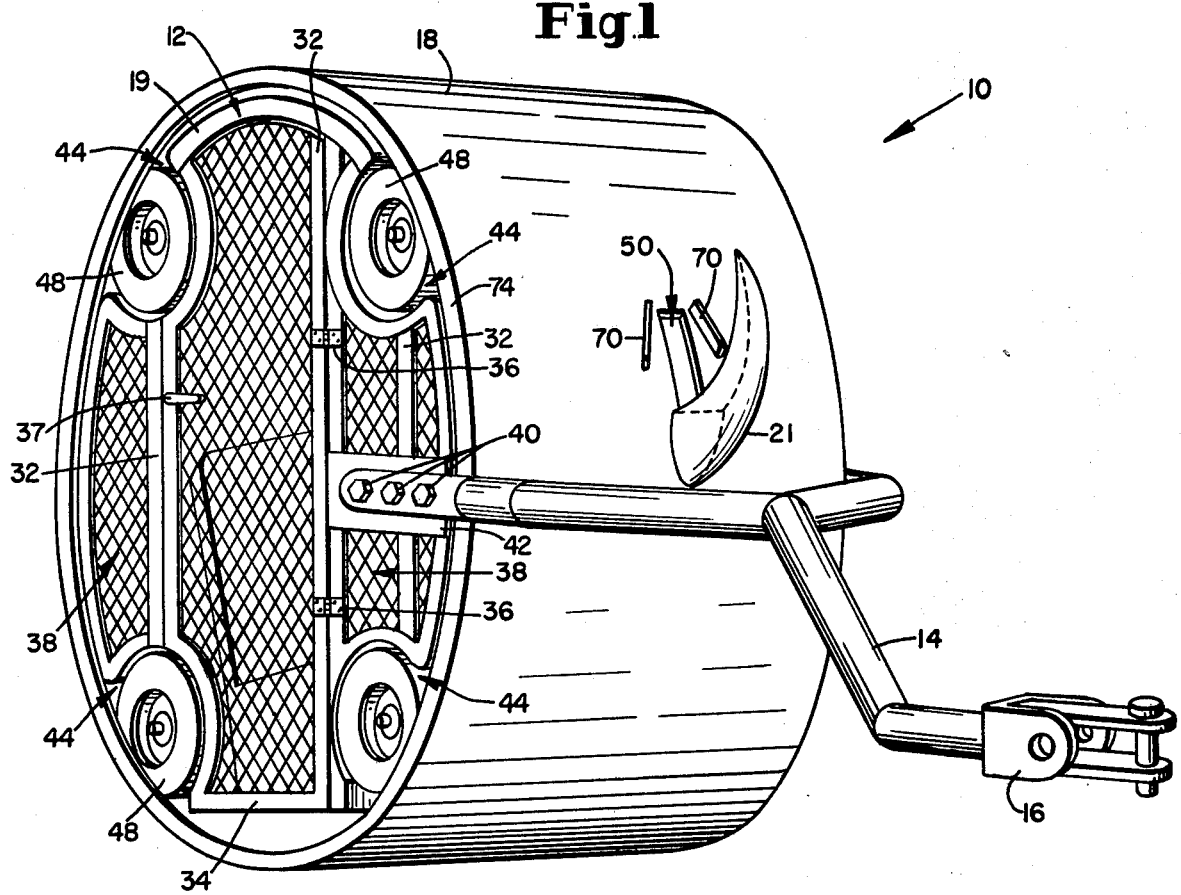
FIG. 1 is a perspective view of the rolling drum tree planter of the present invention.

In the embodiment of the invention as shown in FIGS. 1 through 4, there is provided a tree planting machine 10 which includes a carriage 12 and tongue 14 assembly, with a universal type hitch 16 mounted at the forward end of the tongue 14 for attachment to a tractor or other vehicle (not shown) for pulling the machine 10 over the ground. A cylindrical drum 18 is rotatably mounted on the carriage 12, as described hereinafter, and serves as the ground engaging member as the machine 10 rolls over the ground. A plurality of soil penetrating dibble assemblies 21 are located at equi-distant intervals around the circumference of the drum 18. A slot 50 is located in the drum 18 adjacent each dibble 21 for use in positioning a seedling to be planted.

Figure 2:
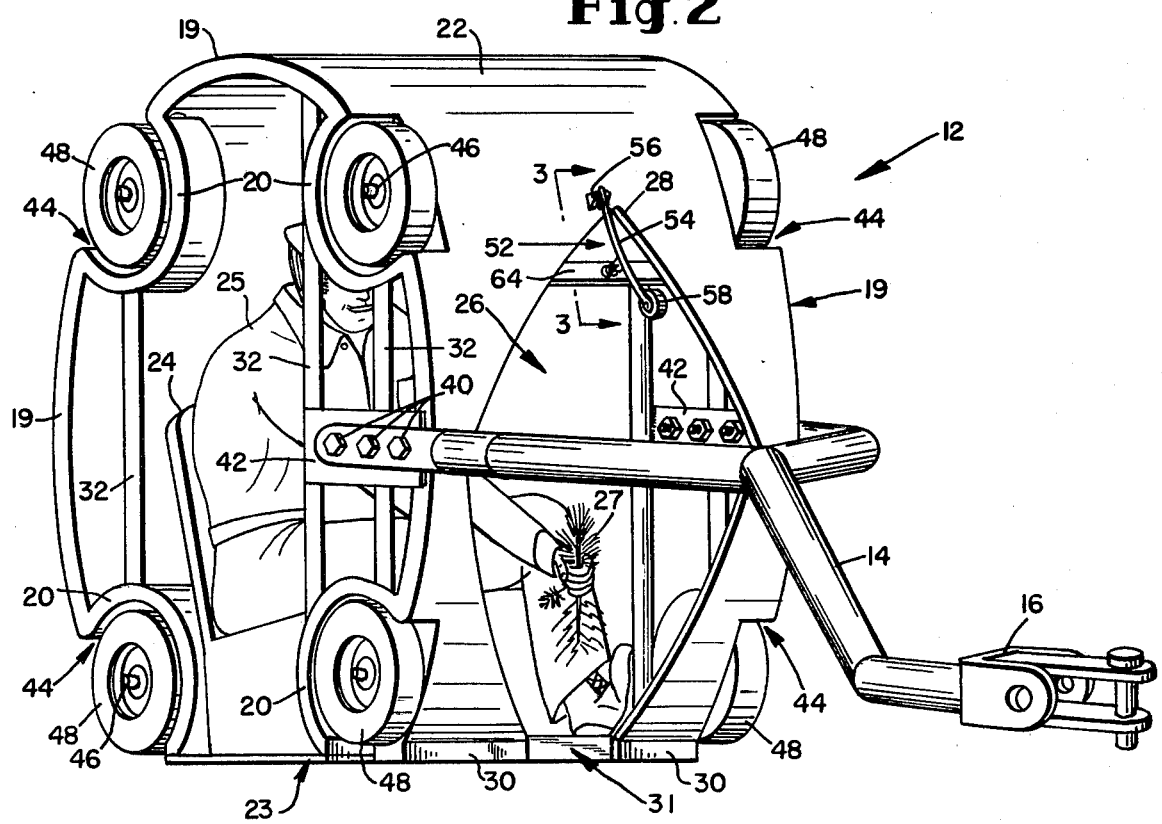
FIG. 2 is a perspective view of the tree planter of FIG. 1, with the outer rolling drum and side screens removed for purposes of clarity.

The carriage 12 is shown in detail in FIG. 2 with the drum 18 removed for purposes of clarity. The support structure for the carriage 12 is provided by a pair of frame members 19, one on each side of the carriage 12, of a generally circular configuration, and having four partially circular indented portions 20 located at evenly spaced intervals about the circumference of the members 19. The exterior portion of the carriage 12 is provided with a cylindrical cover member 22, of sheet metal or similar material, which is secured to the frame members 19 on both sides thereof. The bottom portion of the frame members 19 between adjacent indented portions 20 is removed to make room for the bottom portion of the door to the interior of the carriage, as described hereinafter. A somewhat U-shaped floor member 23 extends horizontally over the lower surface of the carriage 12, with its edges being secured to the frame members 19 and cover member 22.

A seat member 24, of conventional construction, is secured to the rear portion of floor 23 in a position which allows an operator 25 of the machine 10 to sit comfortably within the interior of the carriage 12 and to place the tree seedlings in proper position for planting. An opening 26 is provided in the forward portion of the cover member 22, extending at its upper extremity from a point 28 at approximately the height of the operator's head downwardly to the front edge 30 of the floor 23, then rearwardly at 31 between the side stretches of the U-shaped floor 23 and terminating at the lateral stretch of the U-shaped floor which is located under the operator seat 24. This opening 26 allows the operator to place a tree seedling 27 through the slot 50 in the drum 18 at a point in front of him and to hold the seedling 27 until it reaches the full down position, with roots pointing downwardly, just in front of his seat 24. At this stage, the operator can release the seedling 27 and repeat the process with the next seedling 27 to be planted.

A spring actuated slot cleaner device 52 is mounted on the exterior of the carriage cover 22 adjacent the upper end 28 of the opening 26, as shown in FIGS. 2 and 3. The device 52 includes a metal bar 54 hingedly connected at the upper end thereof to hinge member 56 mounted on the carriage cover 22, and with a skate-type wheel member 58 rotatably mounted at the opposite lower end of the bar 54. The lower end of the bar 54 is curved slightly outwardly to allow the drum 18 to rotate over the slot cleaner 52 without contacting the bar 54. As shown in the side view of FIG. 3, a rod 60 with coil spring 62 mounted so as to encircle the rod 60 is attached to the bar 54 between the hinge 56 and wheel 58, with the rod 60 passing through an opening in a cross bar 64 mounted on the sides of the opening 26. A handle 66 is provided on the inner end of rod 60. The respective ends of the spring 62 are affixed to the cross bar 64 and a pin 68 located on rod 60 adjacent the outer end thereof. The wheel 58 rotates in contact with the inside surface of the drum 18 as the drum 18 rotates while being pulled over the ground, thus compressing the spring 62 against the carriage cross bar 64. When one of the drum slots 50 is rotated to the point where the wheel 58 engages the slot 50, the spring 62 biases the wheel 58 into the slot 50, thus displacing any mud or debris out of the slot 50. As the drum 18 continues to rotate, the wheel 58 is forced back inside the drum 18 where it again rotates in contact with the drum 18 until the next slot 50 comes into position and the slot cleaning process is repeated. The slot cleaner 52 must be manually withdrawn by the operator when backing the machine 10 to avoid breaking the cleaner 52.

As shown in FIGS. 1 and 2, a plurality of vertical brace members 32 are attached at their upper and lower ends to the frame members 19 on each side of the carriage 12. On each side of the carriage 12, a screened door member 34 is attached by hinges 36 to one of the central brace members 32, with a latch 37 provided on the door 34 to allow the door 34 to be releasably secured to an adjacent central brace member 32. Suitable screen material 38 such as medium weight expanded metal screening is provided in the remaining portion of the opening on either side of the carriage 12 thus protecting the operator from debris, vegetation and the like which may be encountered during operation of the machine 10.

The tongue 14 assembly forks so as to pass around each side of the rolling drum 18, being attached to each side of the carriage 12 through bolts 40 which pass through a mounted bracket 42 welded on otherwise secured to the brace members 32 and screening 38 of the carriage 12.

The circular indented portions 20 of the frame members 19, together with matched recesses in the cover member 22 define four wheel wells 44 on each side of the carriage 12 as shown in FIG. 2. Mounted within each wheel well 44 for individual rotation on separate short axles 46 are wheel members 48, referred to as bogie wheels. The axles 46 are attached to plate members, of 1 inch steel or the like, mounted on the inner wall of each wall 44. Each of the wheel members 48 is mounted in position so that the outer portion of the wheel 48 extends radially outwardly from the carriage 12 a distance sufficient to support and maintain the alignment of the drum 18 and allow the drum 18 to rotate freely as it is rolled over the ground. Preferably, the upper wheel members 48 are bolted in slots (not shown) so that the upper wheels 48 can be raised and tightened in the operation position or lowered to allow for easy removal of the carriage assembly 12 from the drum 18. To complete such removal, the tongue assembly 14 would be removed from the carriage 12 and the carriage retaining ring 74 removed from one side of the drum 18.

Attached to each edge of the drum 18 is a carriage retaining ring 74 which functions to keep the drum 18 aligned as it rolls around the carriage 12. The wheels 48 are mounted so as to extend outwardly from the carriage 12 in an axial direction to a point just inside the carriage retaining rings 74.

Mounted on the exterior of the drum 18, which is constructed of ½ inch steel or similar material, are a plurality of soil penetrating implements or dibbles 21. In one embodiment, the dibbles 21 are of scimitar shape as shown in FIGS. 1 and 4. The dibbles 21 may be constructed of steel plate material welded or otherwise secured to the drum 18. The dibbles 21 are located at equal intervals around the circumference of the drum 18, thus defining the interval between trees being planted. In one embodiment, three dibbles 21 are employed at intervals of 120 degrees around the drum 18. A drum slot 50 is located adjacent each dibble 21 at the base thereof so as to be positioned behind the corresponding dibble 21 as it rotates toward the ground during operation. On each side of each drum slot 50 there is mounted a dirt packing block 70 which packs the dirt around the seedling when the dibble 21 reaches the full down position. The dibbles 21 are aligned in a transverse direction on the drum 18 so that the openings made in the ground by the dibbles 21 will be aligned in rows and with the slots 50 aligned so as to pass consecutively into contact with the slot cleaner 52.

The scimitar shape of the dibbles 21 provides a curved blade construction extending generally at a right angle to the drum 18 at the point of attachment and with the point of the blade extending away from the direction of rotation and over the adjacent drum slot 50, as shown in FIG. 4. The sharp edge 72 of the blade is located on the convex side of the dibble 21.

The dimensions of the present invention may of course be varied to adapt the machine to the particular situation in which it is employed. In one embodiment, the drum 18 has a diameter of 54 inches, a width of 42 inches and a thickness of ½ inch. In this embodiment, the scimitar shaped dibbles 21 have a width of 1½ inches at the attachment to the drum 18. The drum slots 50 have a length of 6 inches and a width of 1½ inches while the dirt packing blocks 70 have dimensions of 1½×1½×6 inches. The carriage retaining rings 74 have a diameter of 1¼ inches and are rolled in a circle 53 inches in diameter and bolted to the drum 18. Each of the bogie wheels 48 extends radially outward from the carriage cover 22 a distance of approximately 2 inches.

In carrying out the planting operation, the operator places the roots of the seedling through a drum slot 50 as it passes at about the level of the tongue 14, or even a foot or so lower, so long as he has the seedling in position before the adjacent dibble 21 touches the ground. The dibble 21 is forced into the ground, at the point where it first touches the ground, by the weight of the machine 10 as it rolls forward. The dibble 21 reaches a full vertical position in the ground when the point where the dibble 21 attaches to the drum 18 is in full contact with the ground. As the dibble 21 is being forced into the ground, the roots of the seedling are moving into the slit in the ground created by the blade of the dibble 21. As the dibble 21 reaches the full vertical position (see location A, FIG. 4, where the dibble is shown in phantom lines), the packing blocks 70 force dirt inwardly around the root collar of the seedling, thus completing the planting operation for that seedling. In FIG. 4, there is shown the completion of the planting cycle by the dibble 21 on the left side of the machine 10 and the beginning of the cycle with the dibble 21 on the right side. With a machine having the dimensions as previously described, the distance between planted seedlings will be approximately seven feet. The rate of planting under normal conditions for such a machine will be about one acre per hour.

The rolling drum tree planter of the present invention has many advantages as compared with conventional plow type planters and other devices used for the past 40 years or more. Such advantages include the fact that, because the planter utilizes a spaced ground breaking procedure rather than a continuous plowing action, and since there is no requirement for hydraulics or air, smaller tractors can be used to pull the planter. Also, because there is no continuous plowing action, stumps, roots, rocks and other obstacles do not pose as much of a problem as with a conventional planter. Any obstacle which the tractor itself can clear, usually about 13 inches in height, can be rolled over by the drum planter with no discomfort to the operator. Thus the tree rows will be straighter and the distance between rows more uniform. Such advantages result in much better control over plant spacing and seedlings per acre planted than is possible either by hand planting or by conventional machine planting. This has a positive effect on individual tree size and value in future years.

Additonal advantages of the present tree planter include much less chance of erosion when planting up and down hill than with conventional planters, since there is no continuous plowing action. In addition, because of the rotating action of the drum, very little strain is placed on the tractor unit, so that the planter will operate much better in wet ground conditions without getting stuck. This results in much improved flexibility for planting in adverse weather conditions.

A further feature of the invention is seen in the fact that, since the operator is surrounded by a heavy metal drum, and with heavy metal screens on both sides, the risk of injury to the operator is considerably less than with most conventional planters.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for planting a tree or other plant comprising: a carriage assembly having an opening at least in the forward portion thereof; means for accommodating a human operator of the apparatus in a non-rotating position within said carriage; a cylindrical drum mounted for rotation about the circumference of the carriage; at least one soil penetrating implement attached to the exterior of the drum; and a slot located in the drum adjacent said soil penetrating implement, said slot being aligned with the opening in the carriage during rotation of said drum to allow a plant to be positioned in said slot by the operator for insertion in the ground after contact with the ground is made by the soil penetrating implement.

2. The apparatus of claim 1 wherein a plurality of soil penetrating implements are located at equal intervals around the circumference of the drum.

3. The apparatus of claim 1 wherein a door is mounted on at least one side of the carriage, and with screening material attached to the sides of said carriage.

4. The apparatus of claim 1 wherein a seat for the operator is mounted within said carriage.

5. The apparatus of claim 1 wherein said soil penetrating implement has the shape of a scimitar blade, with its curvature to the point of the blade extending in a direction opposite to the direction of rotation of the drum.

6. The apparatus of claim 1, further including a tongue assembly attached to said carriage, said tongue assembly having hitch means at the outer end thereof for attachment to a tractor or other vehicle for pulling the apparatus over the ground.

7. The apparatus of claim 1 wherein said carriage assembly is of a generally cylindrical shape, and with a plurality of wheel members mounted in wheel wells located at intervals around the circumference of the carriage, said wheel members extending radially outwardly from the exterior of the carriage so as to contact the drum and allow said drum to rotate freely about said carriage.

8. The apparatus of claim 1, further including means mounted on the carriage for displacing mud and debris from said slot.

9. The apparatus of claim 1, 6 or 7 wherein said slot is located behind the soil penetrating implement so that, during rotation of the drum, said soil penetrating implement will contact the ground prior to the contact of the ground by the slot.

10. The apparatus of claim 9 wherein dirt packing means are provided on said drum on each side of said slot.

11. The apparatus of claim 10 wherein a plurality of soil penetrating implements and associated slots and packing means are located at equal intervals around the circumference of the drum.

* * * * *